United States Patent [19]
Jones, Jr.

[11] 3,865,218
[45] Feb. 11, 1975

[54] DIFFERENTIAL FLOW PRESSURE SWITCH FOR DUAL VALVE CIRCUITS

[76] Inventor: Clarence O. Jones, Jr., Eggertsville, N.Y.

[22] Filed: Aug. 16, 1973

[21] Appl. No.: 388,894

Related U.S. Application Data

[63] Continuation-in-part of Ser. No. 192,050, Oct. 26, 1971, abandoned.

[52] U.S. Cl. ............... 192/12 C, 192/129 B, 192/6, 91/358 R, 91/459, 92/131
[51] Int. Cl. ............................................ F15b 13/44
[58] Field of Search ......... 192/129 B, 12 C; 91/220, 91/275, 459, 363 A, 6, 358 R; 92/131

[56] References Cited
UNITED STATES PATENTS

| | | | |
|---|---|---|---|
| 2,642,847 | 6/1953 | Roys | 91/220 |
| 2,755,966 | 7/1956 | Lindors | 91/275 |
| 3,136,224 | 6/1964 | Escobosa | 91/367 A |
| 3,168,008 | 2/1965 | Bingel | 92/131 |
| 3,489,889 | 1/1970 | Escobosa | 91/363 A |
| R22,125 | 6/1942 | Floss | 91/220 |

Primary Examiner—Paul E. Maslousky
Attorney, Agent, or Firm—Christel & Bean

[57] ABSTRACT

It is known to use parallel dual valves for controlling operation of cyclic machines such as power presses and press brakes. Dual solenoid valves are used so that the machine will continue to cycle properly even though one valve fails to close. The present control apparatus provides means for shutting down the machine when one valve fails to close so that operation will not continue with reliance only on the one remaining functional valve. A pressure-responsive element is normally centered in a pressure passage by connecting the pressure output of the two valves to opposite ends of the pressure passage. If one valve fails to close, pressure therefrom shifts the pressure-responsive member from a normally centered position. A normally open reed switch which is interposed in the valve energizing circuit is held closed by a magnet included in the pressure-responsive member but when the latter is shifted due to valve failure the reed switch opens and machine operation is terminated until the abnormality is corrected and the valve energizing circuit is reset.

8 Claims, 2 Drawing Figures

PATENTED FEB 11 1975 3,865,218

DIFFERENTIAL FLOW PRESSURE SWITCH FOR DUAL VALVE CIRCUITS

This invention relates to controls for cyclic machines such as power presses, press brakes, power shears and the like and is a continuation-in-part of my prior application Ser. No. 192,050 filed Oct. 26, 1971 now abandoned.

BACKGROUND OF THE INVENTION

Most mechanical presses, press brakes and the like are operated by a clutch-brake arrangement which alternately couples the crankshaft of the machine to the drive means and, at the conclusion of a work cycle, releases the clutch and couples the brake to the crankshaft. Very commonly the clutch is coupled by air pressure and released by biasing spring means when the air pressure is cut off, the brake being arranged to engage and disengage in opposition to the operation of the clutch.

In controls of this type, failure of the valve to close at the conclusion of a cycle of operation will result in continued cycling of the machine. For this reason it has been proposed to employ dual valves in parallel. In such case if one of the valves remains open at the conclusion of a cycle it will be vented or connected to discharge through the valve which remains operative. Thus the press will properly stop at the end of a cycle. However, in such case there is no indication that one of the valves is inoperative and from then on reliance is on one valve only, with the attendant dangers.

An arrangement which seeks to avoid this danger is found in Bitler Pat. No. 2,636,581 dated Apr. 28, 1953 wherein each of the dual valves opens and closes a switch during its cycle of operation. The two switches are in series in the press cycle initiating circuit so that, unless both switches close at the end of a cycle, a succeeding cycle cannot be initiated. However, in this arrangement both protective switches open and close continuously during normal operation and in high speed presses this means in the neighborhood of 400 cycles per minute which imposes a very high degree of wear on the protective switches.

U.S. Pat. No. 2,906,246 to DiTirro et al., dated Sep. 29, 1959 shows a dual valve arrangement of the general type here under consideration wherein the piston member acted upon at opposite sides by fluid connections from the opposed parallel fluid lines is mechanically locked into an end position when it moves to such position due to unbalanced fluid forces at opposite sides thereof. In this case it is necessary to disassemble the device by removing the cap 108 (FIG. 5) to release locking pin 105 to recondition the safety device for further operation.

In German Pat. No. 1,164,236 of Sept. 3, 1964 a balanced piston arrangement of this general nature mechanically controls a switch 7 so as to operate the switch upon movement of the balanced piston arrangement from a central position.

SUMMARY OF THE INVENTION

The present invention provides protective switch means for dual valves of the type here under consideration wherein the protective parts, including the switch means, do not operate unless there is a valve failure. A balanced pressure-responsive member normally occupies a position wherein it holds a normally-open switch in a closed position as long as the pressure-responsive member is not influenced by an inbalance due to failure of one of the valves to operate in proper sequence. Upon failure of one of the valves the pressure-responsive member becomes unbalanced and shifts, the switch controlled thereby opens, and the valve operating circuit of the machine is opened to prevent further operation of the machine until the abnormal condition is corrected and the valve operating circuit is reset.

DESCRIPTION OF THE ILLUSTRATED EMBODIMENT

Figure 1:
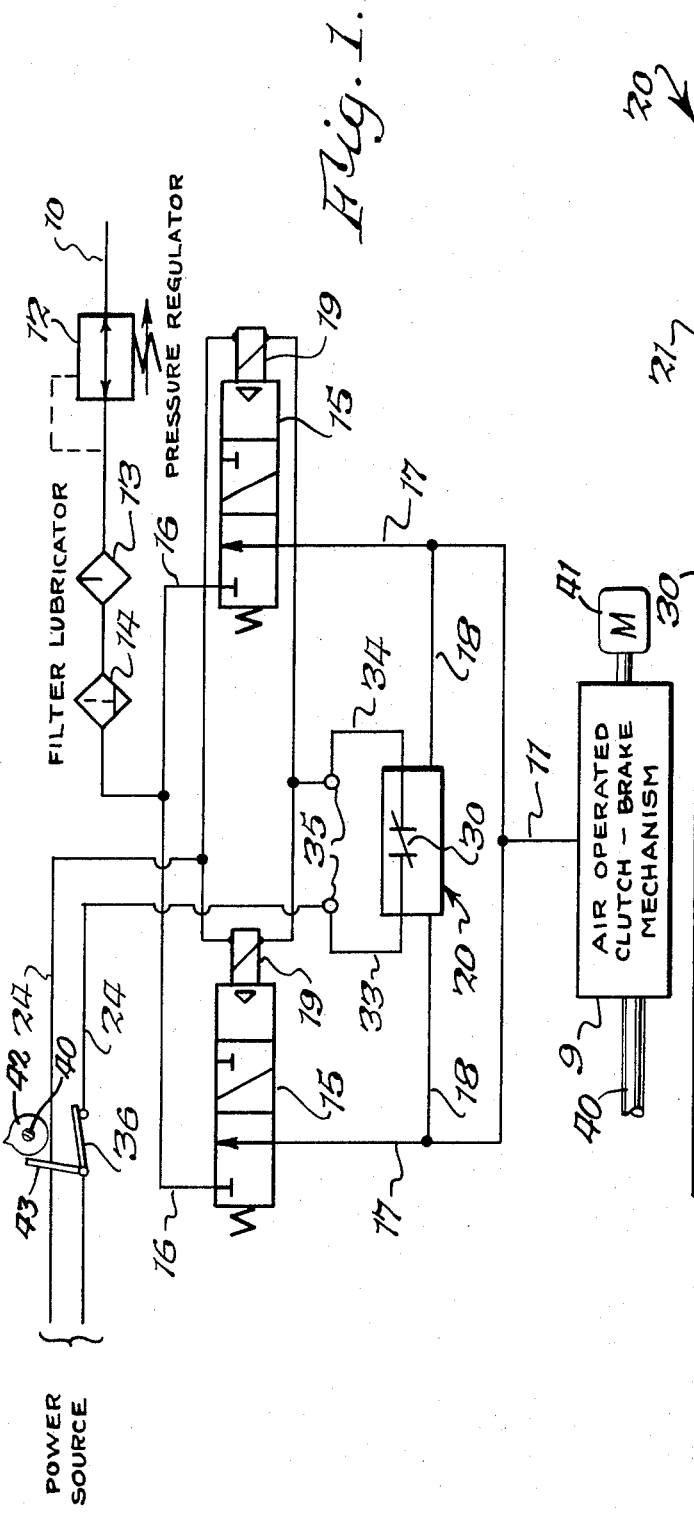
FIG. 1 is a schematic diagram of the dual valve air circuit and the protective control means of the present invention.

In FIG. 1 an air pressure supply conduit is designated 10 and an air line leading to an air operated clutch-brake mechanism 9, by way of example, is designated 11. Clutch-brake mechanism 9 comprises a cycle-initiating means which alternately couples the main drive shaft or crank shaft of the machine, shown schematically at 40 in FIG. 1, with the driving motor of the machine which is designated 41 in FIG. 1 to initiate a cycle of operation and, at the conclusion of the work cycle, the clutch releases and the brake is simultaneously applied to the crank shaft. Air-operated clutch-brake mechanisms of this type are entirely conventional and in practically universal use on mechanical power presses. Air supply conduit 10 has therein a pressure regulator 12, a lubricator 13 and a filter 14, these being conventional adjuncts in air pressure circuits of the present type. A pair of control valves 15 are connected in parallel with air supply conduit 10 by branch conduits 16, the valves 15 being three-way normally closed pilot operated air solenoid valves. The solenoids of valve 15 are designated 19 and are connected in parallel in an energizing circuit 24.

The outlet conduits from valves 15 are designated 17 and merge into the air line 11 leading to the clutch-brake mechanism 9. An air connection across conduits 17 is designated 18 and has interposed therein a differential flow switch mechanism designated generally by the numeral 20 and shown in detail in FIG. 2.

As there shown, a housing 21 of brass or other non-magnetic material has a longitudinal bore 22 with a loosely fitting cylindrical member 23 disposed centrally therein. Member 23 is likewise of brass or other non-magnetic material and is normally held in a balanced central position by a pair of compression coil springs 25 which bear against opposite ends of member 23 and seat against collars 26 threaded into opposite ends of housing 21 for axial adjustment.

The opposite ends of bore 22 are connected across the parallel conduits 17 by the connections 18 as previously described and member 23 is normally subject to balanced air pressure forces at its opposite ends and thus remains centered as shown unless an abnormality occurs. A normally open reed switch 30 is disposed in housing 21 in registry with cylindrical member 23 when the latter is in centered position. The member 23 contains a permanent magnet element 31 which holds reed switch 30 in a closed position when the parts are in the neutral position shown in FIG. 2.

Conductors 33 and 34 from reed switch 30 are connected into the valve solenoid energizing circuit 24 as at 35. Thus the opening of reed switch 30 opens the valve energizing circuit to stop the machine and prevent initiation of a subsequent cycle of operation until this circuit has been reset. The valve solenoid energizing circuit 24 contains a limit switch 36 which is adapted to be opened by a cam 42 on the drive shaft 40 of the machine at the end of a cycle of operation by the engagement of a projection on such cam against an arm 43 on micro-switch 36. Such a cam mechanism is shown, for instance, in FIG. 5 of the aforementioned Bitler U.S. Pat. No. 2,636,581 and also in FIG. 1 of Warnock U.S. Pat. No. 3,283,862 and FIG. 1 of Jordan U.S. Pat. No. 3,280,951. Switches corresponding to the switch 36 of FIG. 1 of the present application are identified at LS1 in FIG. 4 of Jordan U.S. Pat. No. 3,135,289, LS2 of Jordan Pat. No. 3,280,951 and LS1 of Warnock U.S. Pat. No. 3,283,862. At the beginning of a cycle of operation the operator presses a manual start button which energizes a circuit which overrides the limit switch 36 until the projection on cam 40 passes arm 43 and releases the same to permit closure of limit switch 36. A holding circuit then operates to maintain the energizing circuit through conductors 24 through a cycle of operation until cam 42 again opens limit switch 36 at the end of a return stroke of the press. Control circuits of the type referred to here are employed in all of the four patents referred to in the preceding paragraph and are employed on every mechanical power press built at the present time. This control circuitry is accordingly entirely conventional and well known to anyone of ordinary skill in the mechanical power press art.

By way of example the terminals 35 of the present apparatus may be inserted in the control circuit of the Bitler patent between switch 114 and limit switch LS1 in FIG. 6. In Warnock U.S. Pat. No. 3,283,862, referring to the wiring diagram portion of FIG. 1 thereof, the conductor which extends from $L_1$ through stop switch 154 and limit switch LS1 may contain the terminals 35 of the present apparatus by inserting such terminals between $L_1$ and stop switch 154. As indicated by the several prior patents referred to herein, the valve energizing circuit of the present apparatus may be associated with various holding circuit arrangements and the like which do not directly affect the present disclosure and are entirely conventional and therefore need not be further illustrated or described herein.

If one of the valves 15 should fail to close at the end of a normal cycle of machine operation, then air pressure through such valve will act against member 23 to move the same from its centered position to an end position against the resistance of one of the springs 25. This movement of member 23 shifts the latter out of its zone of influence with respect to reed switch 30 whereupon the latter opens and the valve energizing circuit of the machine is opened thereby to cause a termination of operation of the machine.

Figure 2:
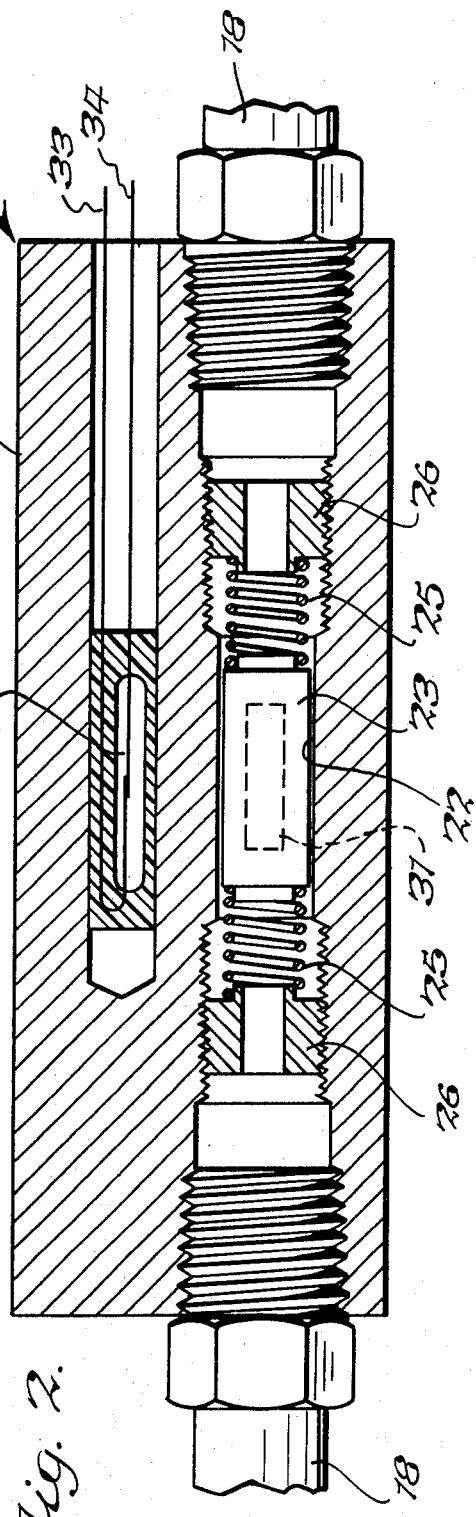
FIG. 2 is a longitudinal cross-sectional view of one form of the differential flow pressure switch element of the invention.

As shown in FIG. 2, cylindrical member 23 fits loosely in bore 22 so that air may flow through the bore around member 23, the latter being subjected to the fluid dynamic air flow which occurs when one of the valves fails to close. This construction permits a certain amount of minor movement or agitation of member 23 during normal operation without material displacement thereof and thus tends to maintain member 23 in a free and loose condition which avoids possible sticking of the member 23 and consequent failure to operate when an abnormality occurs. The desired clearance around member 23 may also be attained by employing a member of polygonal cross section in bore 22.

A preferred embodiment has been described herein and shown in the accompanying drawings to illustrate the underlying principles of the invention but it is to be understood that numerous modifications may be made without departing from the broad spirit and scope of the invention.

I claim:

1. Control means for cyclic machines having air operated cycle initiating means and a source of operating air pressure therefor, a pair of valves connected in parallel between said source and said cycle initiating means, said valves being jointly operated to energize the cycle-initiating means, means operable at the end of a cycle for closing said valves to terminate the cycle of operation, and means effective upon failure of one of said valves to close for preventing the initiation of a subsequent cycle of operation, said means comprising a pressure passage connected at its opposite ends to the pressure output passages of said valves, a pressure responsive member in said passage including a magnetic element, and switch means controlled by said magnetic element and adapted to be reversed by movement of said pressure responsive member from its neutral position by unbalanced output pressure from said valves, said switch means upon such reversal rendering the machine inoperative to effect subsequent cycles.

2. Control means according to claim 1 wherein said switch means is connected in a machine stop circuit.

3. Control means according to claim 1 wherein said switch means is normally open and is maintained closed by said magnetic element when said pressure responsive member is in neutral position.

4. Control means according to claim 3 wherein said switch means is connected in a machine stop circuit to open the same when said pressure responsive member moves from neutral position due to unbalanced output pressures from said valves.

5. Control means according to claim 1 wherein balanced spring members act against the opposed ends of said pressure responsive member for normally retaining the same in a centered neutral position.

6. Control means according to claim 1 wherein said magnetic element comprises a permanent magnet.

7. Control means according to claim 5 wherein said magnetic element comprises a permanent magnet.

8. Control means according to claim 5 wherein said magnetic element comprises a permanent magnet and wherein said switch means is normally open and is held closed by said permanent magnet when said pressure responsive member is in centered neutral position.

* * * * *